US012649077B2

(12) United States Patent
Baldwin et al.

(10) Patent No.: US 12,649,077 B2
(45) Date of Patent: Jun. 9, 2026

(54) METHOD OF EVALUATING THE INERTING CONCENTRATION OF AN AEROSOL FIRE SUPPRESSION AGENT

(71) Applicant: Kidde Technologies Inc., Wilson, NC (US)

(72) Inventors: Eli Baldwin, Knightdale, NC (US); Paul Papas, West Hartford, CT (US); Mark P. Fazzio, Wilson, NC (US); Adam Chattaway, Old Windsor (GB); Lloyd Kent Ballard, Raleigh, NC (US); James Varnell, Black Creek, NC (US); Saul Salas, Knightdale, NC (US); Eric S. Langley, Goldsboro, NC (US)

(73) Assignee: KIDDE TECHNOLOGIES INC., Wilson, NC (US)

( * ) Notice: Subject to any disclaimer, the term of this patent is extended or adjusted under 35 U.S.C. 154(b) by 311 days.

(21) Appl. No.: 18/456,601

(22) Filed: Aug. 28, 2023

(65) Prior Publication Data

US 2024/0350849 A1 Oct. 24, 2024

Related U.S. Application Data

(60) Provisional application No. 63/496,814, filed on Apr. 18, 2023.

(51) Int. Cl.
*A62C 37/50* (2006.01)

(52) U.S. Cl.
CPC .................................... *A62C 37/50* (2013.01)

(58) Field of Classification Search
CPC ................ A62C 37/50; A62C 99/0018; F23L 2900/00001; F23L 2900/07002; F23L 2900/07003; F23L 7/00
See application file for complete search history.

(56) References Cited

FOREIGN PATENT DOCUMENTS

| | | | |
|---|---|---|---|
| CN | 103454387 A | | 12/2013 |
| CN | 203376300 U | * | 1/2014 |
| CN | 211292579 U | | 8/2020 |

OTHER PUBLICATIONS

Extended European Search Report for corresponding European Patent Application No. 24169738.2, dated Sep. 5, 2024, 6 pgs.

* cited by examiner

*Primary Examiner* — Tony Ko
(74) *Attorney, Agent, or Firm* — Kinney & Lange, P.A.

(57) ABSTRACT

A method is disclosed for evaluating inerting concentration of a fire suppression agent. The method includes flowing air upward into a chimney tube and flowing fuel into the flowing air in the chimney tube. A targeted concentration of the fire suppression agent is introduced into the flowing air and into the flowing fuel in the chimney tube. An ignitor is ignited to provide ignition energy to the flowing air and the flowing fuel, and the ignitor is deactivated. The targeted concentration of the fire suppression agent is at or above the inerting concentration of the fire suppression agent if combustion of the flowing fuel does not persist beyond three seconds after the ignitor is deactivated.

19 Claims, 3 Drawing Sheets

METHOD OF EVALUATING THE INERTING CONCENTRATION OF AN AEROSOL FIRE SUPPRESSION AGENT

BACKGROUND

This disclosure is directed to fire suppression agents, and in particular, to testing fire suppression agents.

The aviation industry is moving away from Halon 1301 and other conventional gaseous fire suppression agents due to global warming and ozone related environmental concerns. The replacements to these industry standard agents must demonstrate equivalent fire suppression performance. One common metric used to quantify the performance of a fire suppression agent is inerting concentration. The inerting concentration of a fire suppression agent is the concentration at which the fire suppression agent extinguishes a flame. Many alternative agents involve aerosolized liquids and/or dry powders. Quantifying the inerting concentration of these aerosolized agents is challenging because the standard inerting test method requires quiescent conditions (no airflow) of the fire suppression agent being tested. In these quiescent conditions of the standard inerting test, aerosolized liquids and dry powders settle out of the air because of gravitational effects. Thus, evaluating the inerting concentration of an aerosolized agent is impossible in quiescent conditions.

SUMMARY

A system is disclosed for evaluating inerting concentration of fire suppression agents. The system includes a mixing manifold with a mixing chamber, an air flow inlet fluidically connected to the mixing chamber, a fire suppression agent inlet fluidically connected to the mixing chamber, and a manifold outlet fluidically connected to the mixing chamber. The system also includes a chimney tube extending vertically from the manifold outlet to a chimney outlet, and a burner inside the chimney tube between the manifold outlet and the chimney outlet. An ignitor is inside the chimney tube between the burner and the chimney outlet. A fuel line extends into the chimney tube and is connected to the burner.

A method is disclosed for evaluating inerting concentration of a fire suppression agent. The method includes flowing air vertically upward relative to gravity into a chimney tube at a velocity that exceeds a settling velocity of the fire suppression agent. Fuel flows into the flowing air in the chimney tube via a burner in the chimney tube. A targeted concentration of the fire suppression agent is introduced into the flowing air and into the flowing fuel. An ignitor is activated to provide ignition energy to the flowing air and the flowing fuel. The ignitor is then deactivated. The targeted concentration of the fire suppression agent is determined to be below the inerting concentration of the fire suppression agent if combustion of the flowing fuel persists beyond three seconds after the ignitor is deactivated. The targeted concentration of the fire suppression agent is determined to be above the inerting concentration of the fire suppression agent if the combustion of the flowing fuel does not persist beyond three seconds after the ignitor is deactivated.

A method is disclosed for evaluating inerting concentration of a fire suppression agent. The method includes flowing air vertically upward relative to gravity into a chimney tube and flowing fuel into the flowing air in the chimney tube. A targeted concentration of the fire suppression agent is introduced into the flowing air and into the flowing fuel in the chimney tube. An ignitor in the chimney tube is ignited to provide ignition energy to the flowing air and the flowing fuel, and the ignitor is deactivated. The targeted concentration of the fire suppression agent is determined to be below the inerting concentration of the fire suppression agent if combustion of the flowing fuel occurs and persists beyond three seconds after the ignitor is deactivated. The targeted concentration of the fire suppression agent is determined to be at or above the inerting concentration of the fire suppression agent if combustion of the flowing fuel does not persist beyond three seconds after the ignitor is deactivated.

Figure 1:
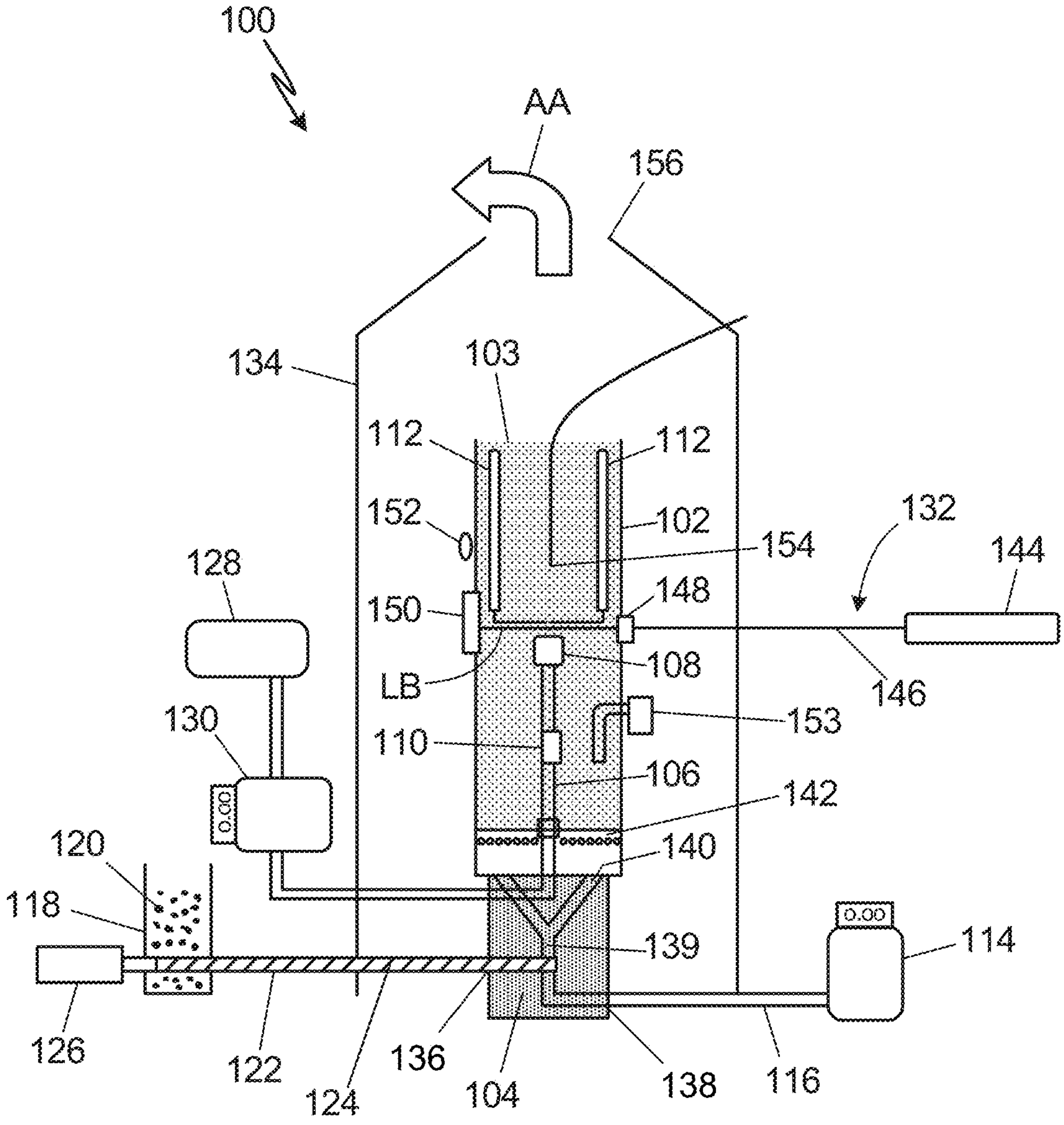
FIG. 1 is a schematic diagram of a system for testing and evaluating an inerting concentration of an aerosolized fire suppression agent.

While the above-identified drawing figures set forth one or more examples, other examples are also contemplated. It should be understood that numerous other modifications and examples can be devised by those skilled in the art, which fall within the scope and spirit of the principles of the claims. The figures may not be drawn to scale, and applications and examples may include features and components not specifically shown in the drawings.

DETAILED DESCRIPTION

FIG. 1 is a schematic diagram of system 100 for testing and evaluating an inerting concentration of aerosolized agent AA. Aerosolized agent AA is a powder, liquid, and/or gaseous fire suppression agent that is mixed with an air flow to form aerosolized agent AA. As shown in FIG. 1, system 100 includes chimney tube 102 with chimney outlet 103, mixing manifold 104, fuel line 106, burner 108, shutter 110, ignitor 112, air mass flow controller 114, air line 116, agent reservoir 118 containing agent 120, feed pipe 122, auger 124, motor 126, gas fuel source 128, fuel flow meter 130, sensors 132, and cabinet 134. Mixing manifold 104 includes agent inlet 136, air flow inlet 138, mixing chamber 139, manifold outlet 140, and screen 142. Sensors 132 include laser 144, fiber patch cable 146, collimator 148, laser detector 150, photodiode 152, and thermocouple 154. Cabinet 134 includes cabinet outlet 156.

Chimney tube 102 and mixing manifold 104 are housed within cabinet 134. In the example of FIG. 1, mixing manifold 104 is positioned underneath chimney tube 102. Chimney tube 102 extends vertically, relative to gravitational ground, from manifold outlet 140 to chimney outlet 103. Chimney tube 102 is formed from a transparent material, such as fire-safe glass or fire-safe plastic, so that a technician and/or sensors can view an interior of chimney tube 102 during operation of system 100. In other examples, chimney tube 102 can include windows to allow visual access to the interior of chimney tube 102 during operation of system 100. Air flow inlet 138 of mixing manifold 104 is fluidically connected to mixing chamber 139. Agent inlet 136 of mixing manifold 104 is also fluidically connected to mixing chamber 139. Manifold outlet 140 is above mixing chamber 139 relative to ground and is fluidically connected to mixing chamber 139. Air mass flow controller 114 is fluidically connected to air flow inlet 138 of mixing manifold 104 by air line 116. Air mass flow controller 114 measures and controls a flow of air entering air flow inlet 138 and mixing chamber 139.

Feed pipe 122 connects agent reservoir 118 to agent inlet 136 of mixing manifold 104. Auger 124 extends through agent reservoir 118, feed pipe 122, and agent inlet 136. A rotor of motor 126 is connected to an end of auger 124. During operation of system 100, motor 126 rotates auger 124 to deliver agent 120 in agent reservoir 118 to mixing chamber 139 in a controlled manner. Agent 120 in agent reservoir 118 can be a powder fire suppression agent or a liquid fire suppression agent. When agent 120 in agent reservoir 118 is a liquid fire suppression agent, feed pipe 122 and auger 124 can be angled at an incline from agent reservoir 118 to mixing chamber 139. Inclining feed pipe 122 and auger 124 can prevent free-flow of agent 120 from agent reservoir 118 to mixing chamber 139. In other examples, agent 120 can be a gaseous fire suppression agent and a hose and gas meter can connect agent reservoir 118 to mixing chamber 139.

When system 100 is in operation, air mass flow controller 114 directs a flow of air into air flow inlet 138 of mixing chamber 139, through mixing chamber 139, through manifold outlet 140, and into chimney tube 102. As the air is flowing through mixing manifold 104 and into chimney tube 102, motor 126 rotates auger 124 to move and meter agent 120 from agent reservoir 118 through feed pipe 122, through agent inlet 136 of mixing manifold 104, and into mixing chamber 139. Once agent 120 reaches mixing chamber 139, agent 120 mixes with the flow of air in mixing chamber 139 and aerosolizes to generate aerosolized agent AA. Aerosolized agent AA flows with the flowing air out of mixing chamber 139, through manifold outlet 140, and into chimney tube 102. The air flowing in mixing manifold 104 and chimney tube 102 flows at a velocity exceeding an aerosol settling velocity of aerosolized agent AA to reduce the likelihood of agent 120 settling out of aerosolized agent AA. Screen 142 is positioned on manifold outlet 140. As the air and aerosolized agent AA flows through manifold outlet 140 and through screen 142, screen 142 helps mix and laminarize the flow of air and aerosolized agent AA entering chimney tube 102. The laminar flow of air and aerosolized agent AA flows vertically up through chimney tube 102 at a velocity that exceeds the aerosol settling velocity of aerosolized agent AA and exits chimney tube 102 through chimney outlet 103. Cabinet 134 encloses chimney tube 102 to contain aerosolized agent AA exiting chimney outlet 103. During operation of system 100, cabin outlet 156 of cabinet 134 can be connected to a sock filter module (not shown) to filter aerosolized agent AA out of the exhaust of chimney tube 102.

Burner 108 is inside chimney tube 102 between manifold outlet 140 and chimney outlet 103. Fuel line 106 extends into chimney tube 102 to connect to burner 108 and supply a gas fuel to burner 108. In the example shown in FIG. 1, fuel line 106 extends vertically to burner 108 inside chimney tube 102 such that fuel line 106 is aligned with the laminar flow of the air and the aerosolized agent AA inside chimney tube 102. Ignitor 112 is inside chimney tube 102 above burner 108 such that ignitor 112 is vertically between burner 108 and chimney outlet 103. Ignitor 112 can include spark electrodes or a wire fuse or a hot surface ignitor or any other device capable of providing sufficient ignition energy to the system to ignite the fuel exiting burner 108. Fuel flow meter 130 fluidically connects fuel line 106 to gas fuel source 128 and controls and meters the amount of the gas fuel entering fuel line 106 and burner 108. The gas fuel can be any gaseous fuel capable of fueling a flame at burner 108. For example, gaseous fuel can be, but is not limited to, propane, butane, methane, and/or hydrocarbon vapor. Gas fuel source 128 can be a pressurized tank of the gaseous fuel or a utility supply line of the gaseous fuel. During operation of system 100, fuel flow meter 130 directs gas fuel into fuel line 106 from gas fuel source 128, and fuel line 106 directs the gas fuel to burner 108. As the gas fuel exits burner 108, the gas fuel mixes with the laminar flow of air and aerosolized agent AA and ignitor 112 ignites the fuel to combust the gas fuel and produce a flame on burner 108.

Sensors 132 include laser 144, fiber patch cable 146, collimator 148, laser detector 150, photodiode 152, and thermocouple 154. As shown in the example of FIG. 1, collimator 148 is mounted onto chimney tube 102 and laser detector 150 is mounted to chimney tube 102 opposite collimator 148. Fiber patch cable 146 connects an output of laser 144 to collimator 148 such that laser 144 is a light source that supplies a laser beam LB to collimator 148. Collimator 148 focuses the laser beam LB and/or aims the laser beam LB through chimney tube 102 to laser detector 150. Laser detector 150 is a light sensor that measure light transmission of the laser beam LB. During operation of system 100, laser detector 150 can be used to determine a concentration of aerosolized agent AA flowing through chimney tube 102 by measuring changes in light transmission of the laser beam LB caused by the flow of aerosolized agent AA passing through the laser beam LB. System 100 is calibrated to correlate certain light transmissions of the laser beam LB with certain concentration levels of aerosolized agent AA in the flowing air inside of chimney tube 102.

Photodiode 152 is a light sensor that faces an exterior surface of chimney tube 102 and is positioned along a height of chimney tube 102 between burner 108 and chimney outlet 103. The flame of burner 108 serves as a light source for photodiode 152. During operation of system 100, photodiode 152 faces a flame of burner 108 and measures light transmission of the flame. Photodiode 152 can also be used to determine the concentration of aerosolized agent AA flowing through chimney tube 102 by measuring changes in the light transmission of the flame caused by the flow of aerosolized agent AA passing between photodiode 152 and the flame of burner 108. System 100 is calibrated to correlate certain light transmissions of the flame measured by photodiode 152 with certain concentration levels of aerosolized agent AA in the flowing air inside of chimney tube 102. Thermocouple 154 is inside chimney tube 102 and is above burner 108 and under chimney outlet 103. During operation of system 100, thermocouple 154 is used to determine a temperature above burner 108.

Sensors 132 can also include isokinetic sampling probe 153 in addition to photodiode 152 and laser detector 150, or in place of photodiode 152 and laser detector 150. Isokinetic probe 153 includes a probe tube that extends into chimney tube 102 to collect a sample of aerosolized agent AA during operation of system 100. The sample of aerosolized agent AA collected by isokinetic probe 153 can be weighed or chemically dissolved to determine the amount of aerosolized agent AA collected by isokinetic probe 153. Isokinetic probe 153 can also measure the flow rate through chimney tube 102 which can be used, along with the measured amount of aerosolized agent AA, to determine the concentration of aerosolized agent AA in chimney tube 102. In other examples, air mass flow controller 114 can measure the mass of air directed through chimney tube 102, which can be used with the mass measurements of aerosolized agent AA from isokinetic probe 153 to determine the concentration of aerosolized agent AA in chimney tube 102.

The concentration of aerosolized agent AA can also be determined using motor 126, auger 124, and air mass flow controller 114. The mass of aerosolized agent AA introduced into the air flowing in chimney tube 102 can be determined by tracking and measuring a rotational speed of motor 126 and feed rate of agent 120 by auger 124. As previously noted, air mass flow controller 114 can measure the mass and flow rate of the air in chimney tube 102. With the mass and flow rate of the air in chimney tube 102 known and the mass and feed rate of agent 120 known, the concentration of aerosolized agent AA can be calculated by taking a ratio between the mas of the air flowing through chimney tube 102 and the mass of agent 120 aerosolized into aerosolized agent AA. During operation of system 100, any aerosolized agent AA that settles out of the air flow in chimney 120 can be collected, weighed, and discounted from the calculation of the concentration of aerosolized agent AA.

To quantify an inerting concentration of aerosolized agent AA, the following method is utilized. First the flow of air in chimney tube 102 and the flow of fuel in fuel line 106 are established. Then a targeted concentration of aerosolized agent AA is fed into chimney tube 102. Ignitor 112 is then activated to provide sufficient ignition energy and then deactivated. If combustion persists for longer than three seconds after ignitor 112 is deactivated, then the supplied concentration of aerosolized agent AA was below the inerting concentration. If combustion does not persist beyond three seconds after ignitor 112 is deactivated, then the supplied concentration of aerosolized agent AA was above the inerting concentration. The concentration of aerosolized agent AA in the air flowing in chimney tube 102 can be controlled by adjusting the speed of motor 126 so that auger 122 delivers agent 120 into mixing manifold 104 at faster or slower rates. Laser detector 150 and photodiode 152 are used as described above to quantify the concentration of aerosolized agent AA during the period of time when ignitor 112 was active. As discussed below with reference to FIG. 2, shutter 110 is on fuel line 106 and can be used by system 100 to adjust mixing of aerosolized agent AA and the air in chimney tube 102 with the fuel in fuel line 106, thus providing control over the air-fuel ratio at the burner 108 and allowing for the inerting concentration of aerosolized agent AA to be evaluated over a range of conditions.

Figure 2:
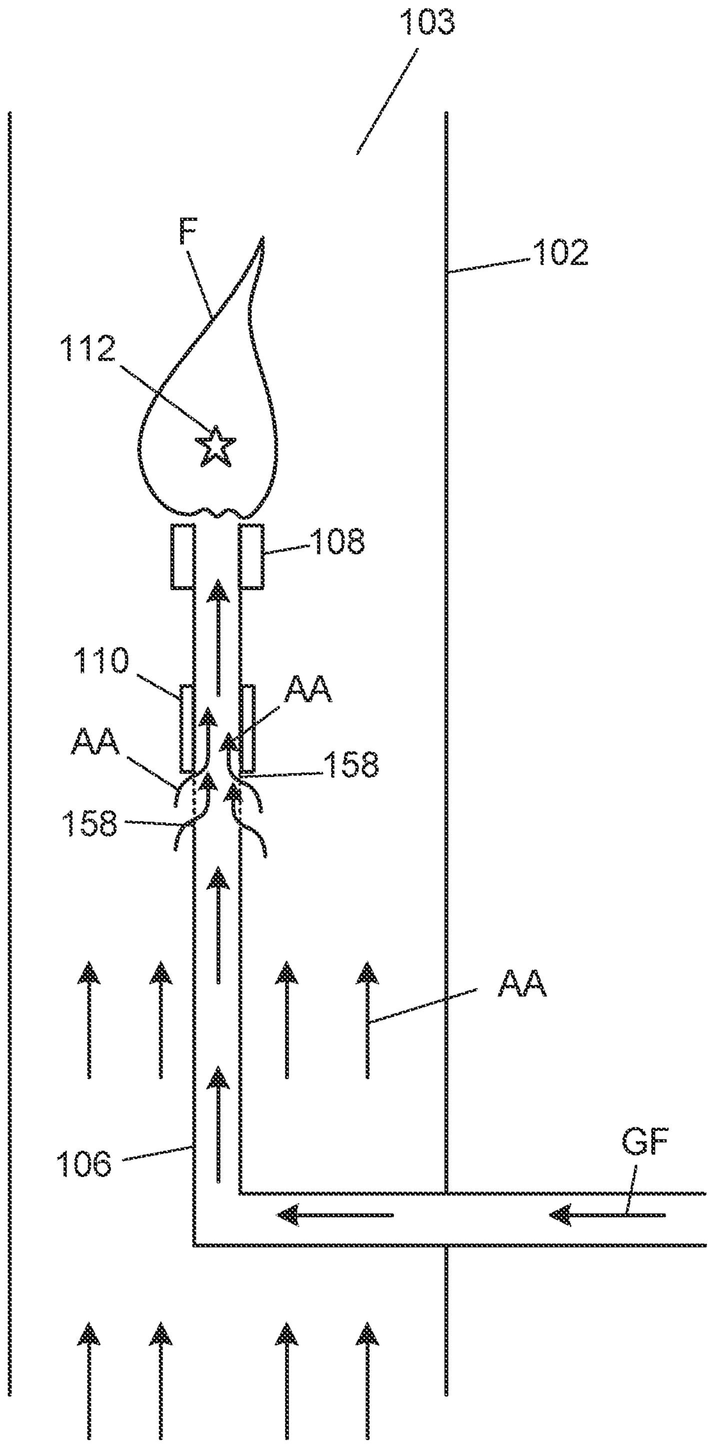
FIG. 2 is a schematic diagram of a chimney tube, a burner, and a fuel line of the system from FIG. 1.

FIG. 2 is a schematic diagram of chimney tube 102, burner 108, and fuel line 106 of system 100 from FIG. 1. In the example of FIG. 2, fuel line 106 inside of chimney tube 102 includes shutter 110 and entrainment holes 158. Entrainment holes 158 are formed in fuel line 106 and fluidically connect an interior passage of fuel line 106 with the flow of air and aerosolized agent AA in chimney tube 102. Shutter 110 is on fuel line 106 and can move and adjust position on fuel line 106 to cover and close entrainment holes 158, to partially cover entrainment holes 158, and to fully uncover and open entrainment holes 158. In the example of FIG. 2, shutter 110 is a sleeve that slides on fuel line 106 and has a length sufficient to cover entrainment holes 158 when shutter 110 is slid over entrainment holes 158. In other examples, shutter 110 can be connected to fuel line 106 by a threaded connection between shutter 110 and fuel line 106 such that shutter 110 can be twisted up or down on fuel line 106 to cover or partially cover entrainment holes 158. During operation of system 100, as discussed above with reference to FIG. 1, the laminar flow of air and aerosolized agent AA flows vertically up through chimney tube 102 at a velocity that exceeds the aerosol settling velocity of aerosolized agent AA. As the laminar flow of air and aerosolized agent AA flows vertically up through chimney tube 102, gas fuel GF flows through fuel line 106 to burner 108 for ignition and combustion to produce flame F. While gas fuel GF flows through fuel line 106 to burner 108, a portion of aerosolized agent AA and the air flowing in chimney tube 102 flows through entrainment holes 158 into fuel line 106 to mix with gas fuel GF and flow to burner 108. Allowing aerosolized agent AA and air to mix with gas fuel GF before gas fuel GF is combusted at burner 108 helps to evaluate the efficacy of aerosolize agent AA at inerting gas fuel GF. The amount of aerosolized agent AA and air flowing into fuel line 106 through entrainment holes 158 can be controlled and adjusted by shutter 110, thereby allowing a technician to tune and test different mixtures and concentrations of aerosolized agent AA and air in gas fuel GF.

Figure 3:
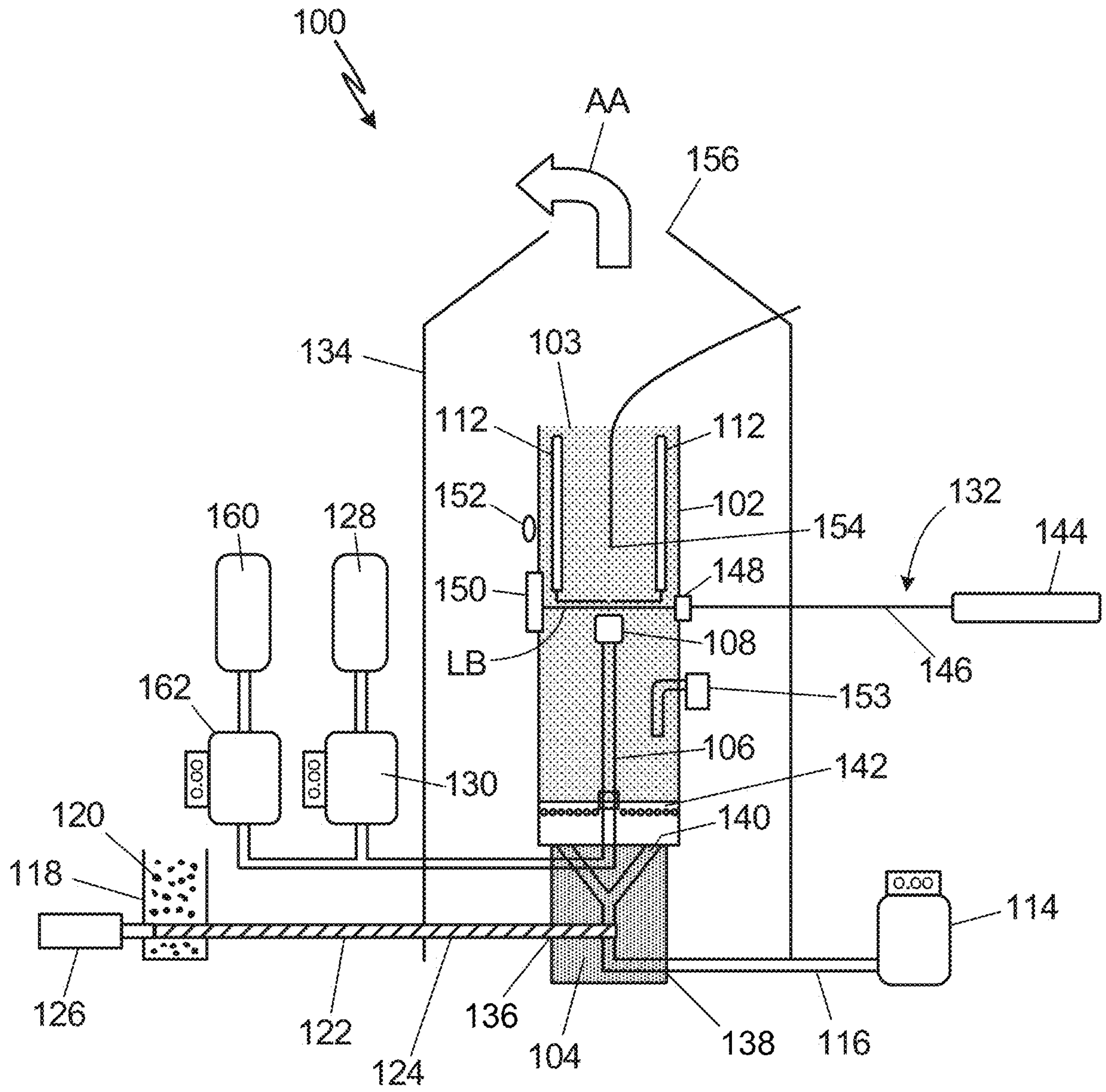
FIG. 3 is a schematic diagram of another example of the system for testing and evaluating an inerting concentration of an acrosolized fire suppression agent.

FIG. 3 is a schematic diagram of another example of system 100 for testing and evaluating an inerting concentration of aerosolized agent AA. System 100 shown in FIG. 3 is similar to the example of system 100 in FIG. 1 except fuel line 106 of system 100 in FIG. 3 does not include entrainment holes 158 and shutter 110. System 100 in FIG. 3 includes air source 160 and air flow meter 162 located outside cabinet 134. Air flow meter 162 fluidically connects air source 160 to fuel line 106. Air flow meter 162 controls and meters air from air source 160 that is mixed into the gas fuel inside of fuel line 106. During operation of system 100 of FIG. 3, the flame at burner 108 receives oxygen from the air and gas fuel mixture in fuel line 106 and is not completely dependent on oxygen present in the mixed air and aerosolized agent AA flowing through chimney tube 102. By adjusting the flow rates of air and fuel the stoichiometry (fuel/air ratio) can be adjusted. Since the flame of burner 108 receives oxygen from fuel line 106, the flame of system 100 of FIG. 3 can be more difficult for aerosolized agent AA to extinguish than the flame of system 100. As the flame of system 100 of FIG. 3 is more difficult to extinguish than the system of FIG. 1, system 100 of FIG. 3 can be used to simulate scenarios where the inerting concentration of aerosolized agent AA needs to be more robust.

Discussion of Possible Embodiments

The following are non-exclusive descriptions of possible embodiments of the present invention.

In one example, a system is disclosed for evaluating inerting concentration of fire suppression agents. The system includes a mixing manifold with a mixing chamber, an air flow inlet fluidically connected to the mixing chamber, a fire suppression agent inlet fluidically connected to the mixing chamber, and a manifold outlet fluidically connected to the mixing chamber. The system also includes a chimney tube extending vertically from the manifold outlet to a chimney outlet, and a burner inside the chimney tube between the manifold outlet and the chimney outlet. An ignitor is inside the chimney tube between the burner and the chimney outlet. A fuel line extends into the chimney tube and is connected to the burner.

The system of the preceding paragraph can optionally include, additionally and/or alternatively, any one or more of the following features, configurations and/or additional components:

the fuel line extends vertically upward toward the burner inside the chimney tube, and wherein the fuel line comprises: entrainment holes formed in the fuel line, wherein the entrainment holes fluidically connect an interior passage of the fuel line with the chimney tube; and a shutter on the fuel line, wherein the shutter is configured to move on the fuel line to open and/or at least partially cover and close the entrainment holes;

the shutter is a sleeve that slides on the fuel line;

the shutter is connected to the fuel line by a threaded connection between the shutter and the fuel line;

a fuel flow meter fluidically connecting the fuel line to a gas fuel source;

an air mass flow controller fluidically connected the air flow inlet of the mixing manifold;

an agent reservoir connected to the fire suppression agent inlet of the mixing manifold; an auger extending through the agent reservoir and the fire suppression agent inlet; and a motor connected to the auger;

a screen on the manifold outlet;

the system further comprising: a laser; a laser detector mounted to the chimney tube; a collimator mounted onto the chimney tube opposite the laser detector and configured to focus a laser beam from the laser and/or aim the laser beam across the chimney tube to the laser detector; and/or a thermocouple inside the chimney tube between the burner and the chimney outlet;

and/or a photodiode facing the burner and the ignitor; and/or an isokinetic probe comprising a probe tube extending into the chimney tube.

In another example, a method is disclosed for evaluating inerting concentration of a fire suppression agent. The method includes flowing air vertically upward relative to gravity into a chimney tube at a velocity that exceeds a settling velocity of the fire suppression agent. Fuel flows into the flowing air in the chimney tube via a burner in the chimney tube. A targeted concentration of the fire suppression agent is introduced into the flowing air and into the flowing fuel. An ignitor is activated to provide ignition energy to the flowing air and the flowing fuel. The ignitor is then deactivated. The targeted concentration of the fire suppression agent is determined to be below the inerting concentration of the fire suppression agent if combustion of the flowing fuel persists beyond three seconds after the ignitor is deactivated. The targeted concentration of the fire suppression agent is determined to be above the inerting concentration of the fire suppression agent if the combustion of the flowing fuel does not persist beyond three seconds after the ignitor is deactivated.

The method of the preceding paragraph can optionally include, additionally and/or alternatively, any one or more of the following features, configurations and/or additional components:

directing a portion of the fire suppression agent and the air flowing in the chimney tube through entrainment holes in a fuel line of the burner to mix with the flowing fuel in the fuel line;

controlling a flow of the portion of the fire suppression agent and the air passing through the entrainment holes with a shutter on the fuel line;

quantifying the targeted concentration of the fire suppression agent in the flowing air in the chimney tube by: aiming a collimated laser beam from a laser through the chimney tube to a laser detector positioned on an opposite side of the chimney tube from the laser; and measuring, by the laser detector, a light transmission of the collimated laser beam;

quantifying the targeted concentration of the fire suppression agent in the flowing air in the chimney tube by measuring a light transmission of a flame of the burner with a photodiode;

quantifying the targeted concentration of the fire suppression agent in the flowing air in the chimney tube by: collecting a sample of the fire suppression agent in the flowing air in the chimney tube with an isokinetic probe; measuring a mass of the sample; measuring a mass of the flowing air in the chimney tube with the isokinetic probe and/or an air mass flow controller; and calculating a ratio between the mass of the sample with the mass of the flowing air in the chimney tube;

passing the flowing air through a mixing manifold prior to directing the flowing air vertically upward into the chimney tube; and metering a powder, liquid, and/or gaseous fire suppression agent into the mixing manifold to mix the powder, liquid, and/or gaseous fire suppression agent with the flowing air in the mixing manifold to generate the fire suppression agent; and/or passing the flowing air and the fire suppression agent through a screen before entering the chimney tube to laminarize the flowing air and the fire suppression agent.

In another example, a method is disclosed for evaluating inerting concentration of a fire suppression agent. The method includes flowing air vertically upward relative to gravity into a chimney tube and flowing fuel into the flowing air in the chimney tube. A targeted concentration of the fire suppression agent is introduced into the flowing air and into the flowing fuel in the chimney tube. An ignitor in the chimney tube is ignited to provide ignition energy to the flowing air and the flowing fuel, and the ignitor is deactivated. The targeted concentration of the fire suppression agent is determined to be below the inerting concentration of the fire suppression agent if combustion of the flowing fuel occurs and persists beyond three seconds after the ignitor is deactivated. The targeted concentration of the fire suppression agent is determined to be at or above the inerting concentration of the fire suppression agent if combustion of the flowing fuel does not persist beyond three seconds after the ignitor is deactivated.

The method of the preceding paragraph can optionally include, additionally and/or alternatively, any one or more of the following features, configurations and/or additional components:

measuring the targeted concentration of the fire suppression agent in the flowing air in the chimney tube by measuring, by a light sensor, a light transmission passing through the fire suppression agent and the chimney tube from a light source and correlating the light transmission with a certain concentration level of the fire suppression agent.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for evaluating inerting concentration of fire suppression agents comprises:

a mixing manifold comprising a mixing chamber, an air flow inlet fluidically connected to the mixing chamber, a fire suppression agent inlet fluidically connected to the mixing chamber, and a manifold outlet fluidically connected to the mixing chamber;

a chimney tube extending vertically from the manifold outlet to a chimney outlet;

a burner inside the chimney tube between the manifold outlet and the chimney outlet;

an ignitor inside the chimney tube between the burner and the chimney outlet; and a fuel line extending into the chimney tube and connected to the burner, wherein the fuel line extends vertically upward toward the burner inside the chimney tube, and wherein the fuel line comprises entrainment holes formed in the fuel line, wherein the entrainment holes fluidically connect an interior passage of the fuel line with the chimney tube.

2. The system of claim 1, wherein the fuel line further comprises a shutter on the fuel line, wherein the shutter is configured to move on the fuel line to open and/or at least partially cover and close the entrainment holes.

3. The system of claim 2, wherein the shutter is a sleeve that slides on the fuel line.

4. The system of claim 2, wherein the shutter is connected to the fuel line by a threaded connection between the shutter and the fuel line.

5. The system of claim 1 further comprising:

a fuel flow meter fluidically connecting the fuel line to a gas fuel source; and an air flow meter fluidically connecting the fuel line to an air source.

6. The system of claim 5 further comprising:

an air mass flow controller fluidically connected to the air flow inlet of the mixing manifold.

7. The system of claim 6 further comprising:

an agent reservoir connected to the fire suppression agent inlet of the mixing manifold;

an auger extending through the agent reservoir and the fire suppression agent inlet; and a motor connected to the auger.

8. The system of claim 7 further comprising:

a screen on the manifold outlet.

9. The system of claim 8 further comprising:

a laser;

a laser detector mounted to the chimney tube; and a collimator mounted onto the chimney tube opposite the laser detector and configured to focus a laser beam from the laser and/or aim the laser beam across the chimney tube to the laser detector.

10. The system of claim 9 further comprising:

a thermocouple inside the chimney tube between the burner and the chimney outlet; and/or a photodiode facing the burner and the ignitor; and/or an isokinetic probe comprising a probe tube extending into the chimney tube.

11. A method for evaluating inerting concentration of a fire suppression agent, wherein the method comprises:

flowing air vertically upward relative to gravity into a chimney tube at a velocity that exceeds a settling velocity of the fire suppression agent;

flowing fuel into the flowing air in the chimney tube via a burner in the chimney tube;

introducing a targeted concentration of the fire suppression agent into the flowing air and into the flowing fuel;

activating an ignitor to provide ignition energy to the flowing air and the flowing fuel;

deactivating the ignitor;

determining the targeted concentration of the fire suppression agent is below the inerting concentration of the fire suppression agent if combustion of the flowing fuel persists beyond three seconds after the ignitor is deactivated; and determining the targeted concentration of the fire suppression agent is above the inerting concentration of the fire suppression agent if the combustion of the flowing fuel does not persist beyond three seconds after the ignitor is deactivated.

12. The method of claim 11 further comprising:

directing a portion of the fire suppression agent and the air flowing in the chimney tube through entrainment holes in a fuel line of the burner to mix with the flowing fuel in the fuel line.

13. The method of claim 12 further comprising:

controlling a flow of the portion of the fire suppression agent and the air passing through the entrainment holes with a shutter on the fuel line.

14. The method of claim 11 further comprising:

quantifying the targeted concentration of the fire suppression agent in the flowing air in the chimney tube by:

aiming a collimated laser beam from a laser through the chimney tube to a laser detector positioned on an opposite side of the chimney tube from the laser; and measuring, by the laser detector, a light transmission of the collimated laser beam.

15. The method of claim 11 further comprising:

quantifying the targeted concentration of the fire suppression agent in the flowing air in the chimney tube by measuring a light transmission of a flame of the burner with a photodiode.

16. The method of claim 11 further comprising:

quantifying the targeted concentration of the fire suppression agent in the flowing air in the chimney tube by:

collecting a sample of the fire suppression agent in the flowing air in the chimney tube with an isokinetic probe;

measuring a mass of the sample;

measuring a mass of the flowing air in the chimney tube with the isokinetic probe and/or an air mass flow controller; and calculating a ratio between the mass of the sample with the mass of the flowing air in the chimney tube.

17. The method of claim 11 further comprising:

passing the flowing air through a mixing manifold prior to directing the flowing air vertically upward into the chimney tube; and metering a powder, liquid, and/or gaseous fire suppression agent into the mixing manifold to mix the powder, liquid, and/or gaseous fire suppression agent with the flowing air in the mixing manifold to generate the fire suppression agent.

18. The method of claim 17 further comprising:

passing the flowing air and the fire suppression agent through a screen before entering the chimney tube to laminarize the flowing air and the fire suppression agent.

19. A method for evaluating inerting concentration of a fire suppression agent, wherein the method comprises:

flowing air vertically upward relative to gravity into a chimney tube;

flowing fuel into the flowing air in the chimney tube;

introducing a targeted concentration of the fire suppression agent into the flowing air and into the flowing fuel in the chimney tube;

measuring the targeted concentration of the fire suppression agent in the flowing air in the chimney tube by measuring, by a light sensor, a light transmission passing through the fire suppression agent and the chimney tube from a light source and correlating the light transmission with a certain concentration level of the fire suppression agent;

activating an ignitor in the chimney tube to provide ignition energy to the flowing air and the flowing fuel;

deactivating the ignitor;

determining the targeted concentration of the fire suppression agent is below the inerting concentration of the fire suppression agent if combustion of the flowing fuel occurs and persists beyond three seconds after the ignitor is deactivated; and determining the targeted concentration of the fire suppression agent is at or above the inerting concentration of the fire suppression agent if combustion of the flowing fuel does not persist beyond three seconds after the ignitor is deactivated.

* * * * *